Oct. 4, 1932.  E. S. ANDERSON  1,881,113
RUMBLE SEAT STEP
Original Filed July 20, 1929   2 Sheets-Sheet 1
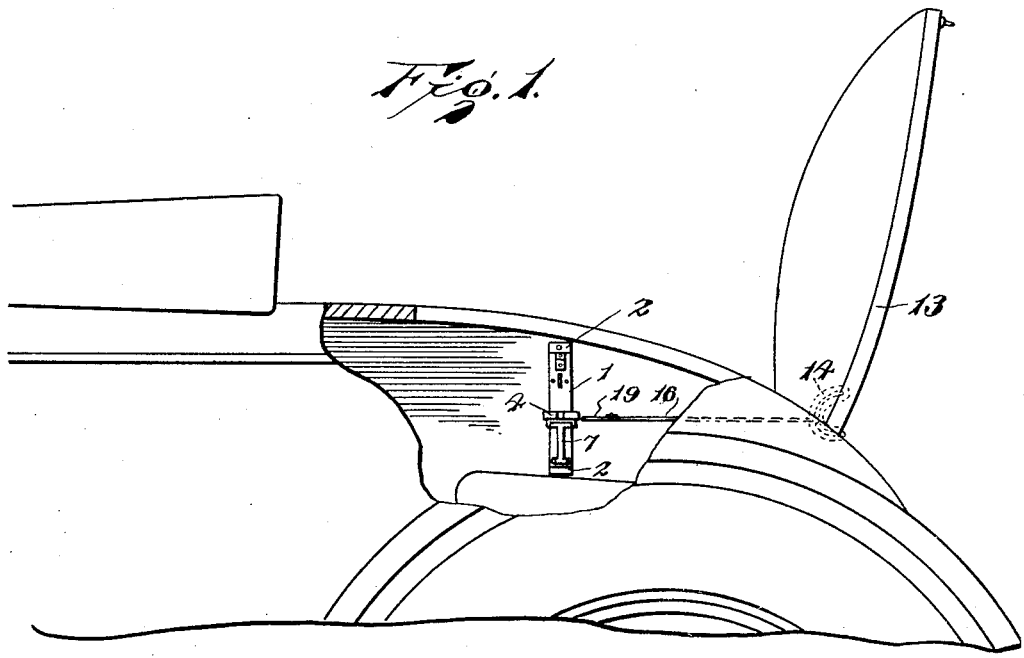
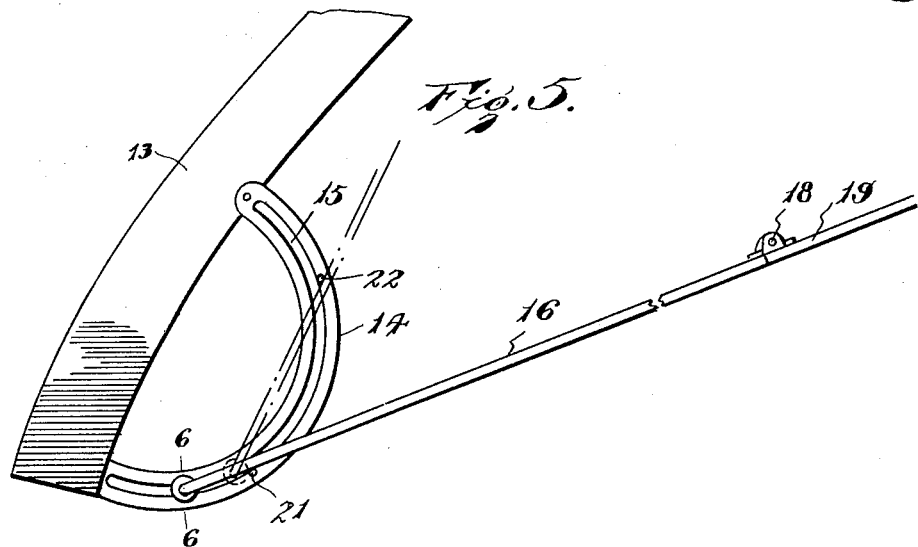
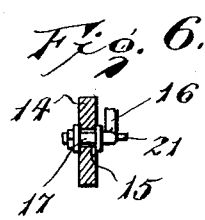
Inventor
E. S. Anderson
By Lacey & Lacey, Attorneys

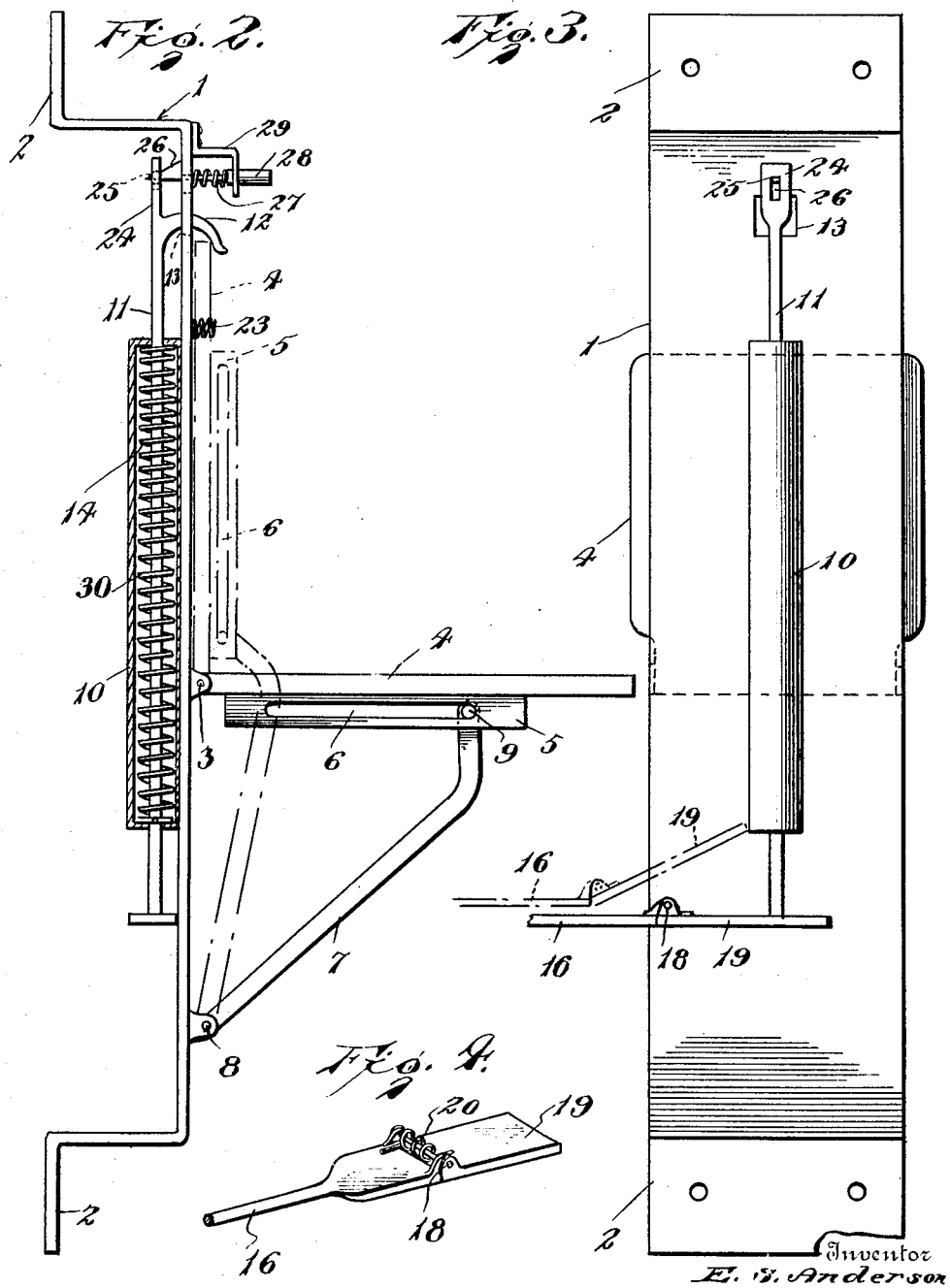

Patented Oct. 4, 1932

1,881,113

UNITED STATES PATENT OFFICE

EARLE S. ANDERSON, OF BOSTON, MASSACHUSETTS

RUMBLE SEAT STEP

Application filed July 20, 1929, Serial No. 379,767. Renewed May 23, 1932.

The present invention is directed to improvements in rumble seat steps.

The primary object of the invention is to provide a step for use in connection with the rumble seats of motor vehicle, the construction being such that when the back of the rumble seat is raised the step will be automatically released to assume a position over the seat cushion to enable a person entering or leaving the rumble seat to place the foot upon the step and not upon the seat cushion as is now the common practice.

Another object of the invention is to provide a step of this nature so constructed that when the step is in its operative position a person can step thereon in entering or leaving the rumble seat without stepping upon the seat cushion, thus preventing soiling of the seat cushion and distortion of the springs thereof.

With these and other objects in view, this invention resides in the novel features of construction, formation, combination and arrangement of parts to be hereinafter more fully described, claimed and illustrated in the accompanying drawings, in which:

Figure 1 is a fragmentary side view of an automobile showing the rumble seat back raised and the step lowered.

Figure 2 is a side elevation of the bracket which supports the step.

Figure 3 is a rear elevation thereof.

Figure 4 is a fragmentary perspective view of the rod tripping lever.

Figure 5 is a view of the lever controlling arm.

Figure 6 is a sectional view on the line 6—6 of Figure 5.

Referring to the drawings, the numeral 1 designates a bracket having flanges 2 carried thereby for attaching the same to the side of the vehicle. To the outer face of the bracket is pivotally connected, as at 3, the step 4 which is provided with spaced flanges 5 having longitudinal slots 6 formed therein. A brace bar 7 is provided and has its lower end pivotally connected to the bracket, as at 8. The upper end of the bar has formed thereon lateral lugs 9 for slidably engaging the slots 6 in order that the step 4 can freely fold and unfold. Obviously, the bar 7 will hold the step in a firm horizontal position, as shown in full lines in Figure 2.

Fixed to the outer face of the bracket 1 is a casing 10 in which is slidable a rod 11, said rod having a hook 12 upon its upper end which is movable in a slot 13 formed in said bracket. A coil spring 14 is mounted in the casing and encircles the rod 11. The upper end of this spring bears against the top of said casing while the lower end thereof is fixed to the rod. The spring 14 serves to hold the hook 12 yieldably engaged with the step 4, as indicated in dotted lines in Figure 2, when the step is in inactive position and out of the way.

Fixed to the rumble seat back 13 is an arcuate arm 14 having an arcuate slot 15 formed therein.

A trip lever 16 is provided and has its rear end provided with an angularly disposed pintle 17 adapted to slide in the slot 15. The forward end of the lever has hingedly connected thereto, as at 18, a plate 19, there being a spring 20 to maintain the plate normally in a plane with the lever. The hinge connection between the plate and lever is such that the plate may swing in one direction only with respect to the lever. The arm 14 is provided with stops 21 and 22, the purpose of which will be later explained. When the seat back 13 is open or elevated, the lever is moved rearwardly. As the seat back is closed, the pintle 17 slides in the slot 15 and the plate 19, due to its hinged connection, slides against the casing 10 and lower end of the rod 11 and will occupy a position under the lower end of the rod, as shown in full lines in Figure 3. When the seat back is raised, the plate 19 will slidably engage the lower end of the rod a sufficient time to elevate the rod sufficiently to cause the hook 12 to disengage the step 4. Upon disengagement of the hook, the step will drop and overhang the rumble seat cushion. Obviously, when the seat back is raised the lever 16 will engage the stop 21 so that said lever will be sustained to exert pressure, through the plate 19, upon the rod 11. As the seat back is closed, the stop 22 will engage the lever so that the plate 19 will snap under the rod 11 to release the step when the seat back is again elevated.

A coil spring 23 is carried by the bracket 5 and will force the step outwardly when the hook 12 is disengaged, thereby causing the step to positively move to its operative position, at which time it overhangs the seat cushion so that a person entering or leaving the rumble seat may step thereon instead of upon the seat cushion.

The rod 11 has its upper end provided with an extension 24 having a slot 25 formed therein and in which is engaged a wedge plate 26 carried by the stem 27, said stem having a finger piece 28 thereon slidable in the bracket 29 suitably fixed to the bracket 1. A coil spring 30 is interposed between the finger piece 28 and bracket 1 and serves to normally hold the wedge plate inactive. After a person enters the rumble seat, the plate 26 is forced inwardly and due to its wedge shape, the rod will be lifted in order that the step can be elevated and engaged by the hook 12 upon release of the finger piece 28. When a person desires to leave the rumble seat, the plate 26 is actuated to release the hook 12 from engagement with the step, whereupon the step drops to its operative position.

It will thus be seen that the stem can be manually operated or automatically operated by the opening and closing of the seat back 13.

From the foregoing, it is though that the operation and many advantages of the herein described invention will be apparent to those skilled in the art without further description, and it will be understood that varous changes in size, shape, proportion and minor details of construction may be resorted to without departing from the spirit or sacrificing any of the advantages of the invention.

What is claimed is:

1. The combinaiton with the hingedly connected seat back of a motor vehicle, of a bracket attached to the vehicle, a step hingedly connected to the bracket, a rod carried by the bracket and having a hook thereon for engaging the step to hold the same folded, and means carried by the seat back for actuating the rod to disengage the hook from the step to permit the same to unfold.

2. The combination with the hinged seat back of a motor vehicle, of a bracket attached to the vehicle, a step hingedly connected with the bracket, a rod carried by the bracket and having a hook carried thereby for normally engaging the step to hold the same folded, means carried by the seat for actuating the rod to disengage the step when the seat back is raised, and means operable to manually actuate the rod to release the seat.

3. The combination with the hingedly connected seat back of a vehicle, of a step hingedly connected with the vehicle, a rod, means on the rod for holding the step elevated, a lever adjustable upon the seat back, said lever having a plate hingedly connected thereto for engaging the rod when the seat back is swung in one direction to elevate the rod and release the step and when swung in a reverse direction being movable under the rod for engagement with the lower end thereof.

4. In a vehicle having a seat and a folding back, a folding step positioned to extend over the seat for one to tread upon when about to occupy or leave the seat, means normally holding the step clear of the seat, and means for tripping said holding means to release the step for assuming its position over the seat.

5. In a vehicle having a seat and a folding back, a folding step positioned to extend over the seat for one to tread upon when about to occupy or leave the seat, a spring actuated rod adapted to engage the step and hold it clear of the seat, and trip means associated with the spring actuated rod to move the same to effect release of the step whereby the latter is free to assume a position over the seat.

6. In a vehicle having a seat and a folding back, a folding step positioned to extend over the seat for one to tread upon when about to occupy or leave the seat, a spring actuated rod adapted to engage the step and hold it clear of the seat, a member pivotally and slidably connected to the said folding back, a plate hinged to the said member and limited in its pivotal movement in one direction and adapted to operate the said rod to effect release of the step, and a spring between the member and hinged plate to normally hold the latter in line with the member.

In testimony whereof I affix my signature.

EARLE S. ANDERSON. [L. S.]